United States Patent
Sugita et al.

(10) Patent No.: US 10,131,348 B2
(45) Date of Patent: Nov. 20, 2018

(54) INFORMATION PROCESSOR AND MOVABLE BODY APPARATUS

(71) Applicant: KABUSHIKI KAISHA TOSHIBA, Tokyo (JP)

(72) Inventors: Kaoru Sugita, Tokyo (JP); Masahiro Sekine, Tokyo (JP); Tomoki Watanabe, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/444,866

(22) Filed: Feb. 28, 2017

(65) Prior Publication Data

US 2017/0341645 A1 Nov. 30, 2017

(30) Foreign Application Priority Data

May 27, 2016 (JP) ................................ 2016-106120

(51) Int. Cl.
*B60W 30/095* (2012.01)
*B60R 21/0134* (2006.01)
(Continued)

(52) U.S. Cl.
CPC ....... *B60W 30/0953* (2013.01); *G05D 1/0055* (2013.01); *G06K 9/00335* (2013.01);
(Continued)

(58) Field of Classification Search
CPC .......... B60W 30/0953; B60W 2550/10; G06K 9/00805; G06K 9/00335; G06K 9/52;
(Continued)

(56) References Cited

U.S. PATENT DOCUMENTS 5,280,622 A * 1/1994 Tino ........................ B25J 19/06
 700/255
5,440,216 A * 8/1995 Kim ........................ A47L 5/28
 15/319

(Continued)

FOREIGN PATENT DOCUMENTS

JP 2008-247111 10/2008
JP 2009-001104 1/2009

(Continued)

OTHER PUBLICATIONS

An interconnected network of UAS as a system-of-systems Rahul Gomes et al., 2017 IEEE/AIAA 36th Digital Avionics Systems Conference (DASC); year: 2017; pp. 1-7.*

(Continued)

*Primary Examiner* — Cuong H Nguyen
(74) *Attorney, Agent, or Firm* — Nixon & Vanderhye, P.C.

(57) ABSTRACT

According to one embodiment, an information processor includes a memory and processing circuitry. The circuitry receives area information indicating a second area in a first area around a movable body apparatus and third areas in the first area, wherein the movable body apparatus is movable in the second area and an object is present in each of the third areas. The circuitry receives movement information including at least one of a velocity, a movement direction or an acceleration of the apparatus. The circuitry acquires evaluation values each indicative of a damage to be caused when the apparatus collides with each object in the third areas, and determines, based on the evaluation values, a position corresponding to a first object which causes a least damage.

19 Claims, 12 Drawing Sheets

(51) Int. Cl.
*G06K 9/00* (2006.01)
*G06T 7/70* (2017.01)
*G06K 9/52* (2006.01)
*G05D 1/00* (2006.01)
*G06K 9/46* (2006.01)
*B60R 21/00* (2006.01)

(52) U.S. Cl.
CPC .......... *G06K 9/00805* (2013.01); *G06K 9/52* (2013.01); *G06T 7/70* (2017.01); *B60R 2021/0027* (2013.01); *B60W 2520/10* (2013.01); *B60W 2520/105* (2013.01); *B60W 2550/10* (2013.01); *B60W 2550/308* (2013.01); *G06K 9/00664* (2013.01); *G06K 2009/4666* (2013.01); *G06T 2207/30252* (2013.01)

(58) Field of Classification Search
CPC ....... G06K 9/00664; G06K 2009/4666; G05D 1/0055; B60R 2021/01013; B60R 2021/0027
USPC ............ 701/93, 301; 700/245–246, 255, 250
See application file for complete search history.

(56) References Cited

U.S. PATENT DOCUMENTS

| | | | | |
|---|---|---|---|---|
| 6,678,582 | B2* | 1/2004 | Waled ...................... | B25J 9/161 318/568.11 |
| 6,941,199 | B1* | 9/2005 | Bottomley ............ | G05D 1/0221 318/587 |
| 7,194,347 | B2* | 3/2007 | Harumoto ........... | B60R 21/0132 340/436 |
| 7,272,467 | B2* | 9/2007 | Goncalves ............. | G01C 21/12 180/168 |
| 7,706,917 | B1* | 4/2010 | Chiappetta ........... | G05D 1/0225 700/245 |
| 7,844,398 | B2* | 11/2010 | Sato ....................... | B25J 9/1666 700/213 |
| 8,150,650 | B2* | 4/2012 | Goncalves ............. | G01C 21/12 700/205 |
| 9,443,430 | B2* | 9/2016 | Beaurepaire ........... | G08G 1/162 |
| 9,701,306 | B2* | 7/2017 | Prokhorov ............ | B60W 30/09 |
| 9,886,841 | B1* | 2/2018 | Nave ..................... | G08B 25/006 |
| 9,892,296 | B2* | 2/2018 | Kovarik ............ | G06K 7/10376 |
| 2004/0193347 | A1* | 9/2004 | Harumoto ........... | B60R 21/0132 701/45 |
| 2010/0217528 | A1* | 8/2010 | Sato ........................ | B25J 9/1666 701/301 |
| 2012/0173018 | A1* | 7/2012 | Allen .................... | G05D 1/0248 700/245 |
| 2015/0070196 | A1* | 3/2015 | Beaurepaire ........... | G08G 1/162 340/932.2 |
| 2016/0001775 | A1 | 1/2016 | Wilhelm et al. | |
| 2016/0132705 | A1* | 5/2016 | Kovarik ............ | G06K 7/10376 340/10.3 |
| 2016/0176398 | A1* | 6/2016 | Prokhorov ............ | B60W 30/09 701/23 |
| 2017/0248953 | A1* | 8/2017 | Kelley .................. | B60W 10/04 |
| 2017/0269586 | A1* | 9/2017 | D'Andrea ............ | G05D 1/0016 |

FOREIGN PATENT DOCUMENTS

| | | |
|---|---|---|
| JP | 2009-274700 | 11/2009 |
| JP | 5761089 | 8/2015 |
| JP | 2016-015142 | 1/2016 |

OTHER PUBLICATIONS

Predictive cruise control with autonomous overtaking; Nikolce Murgovski; Jonas Sjöberg; 2015 54th IEEE Conference on Decision and Control (CDC); Year: 2015; pp. 644-649.*

Georgios Floros et al., "Joint 2D-3D temporally consistent semantic segmentation of street scenes," https://www.semanticscholar.org/paper/Joint-2D-3D-temporally-consistent-semantic-Floros-Leibe/balla6ca6e86ada565c2ed1f265e7dc8bb349231, 2012, 7 pages.

Softbank Corporation, "Special feature: robot x ICT: Pepper—With the world's first emotion Personal robot," (and English-language machine translation thereof), ITU Journal, vol. 45, No. 9, Sep. 6, 2015, pp. 22-25 https://www.ituaj.jp/wp-content/uploads/2015/09/2015 09-06-sp5.pdf.

"Pascal-Context Dataset,"2014 http://www.cs.stanford.edu/~roozbeh/pascal-context/, 8 pages.

* cited by examiner

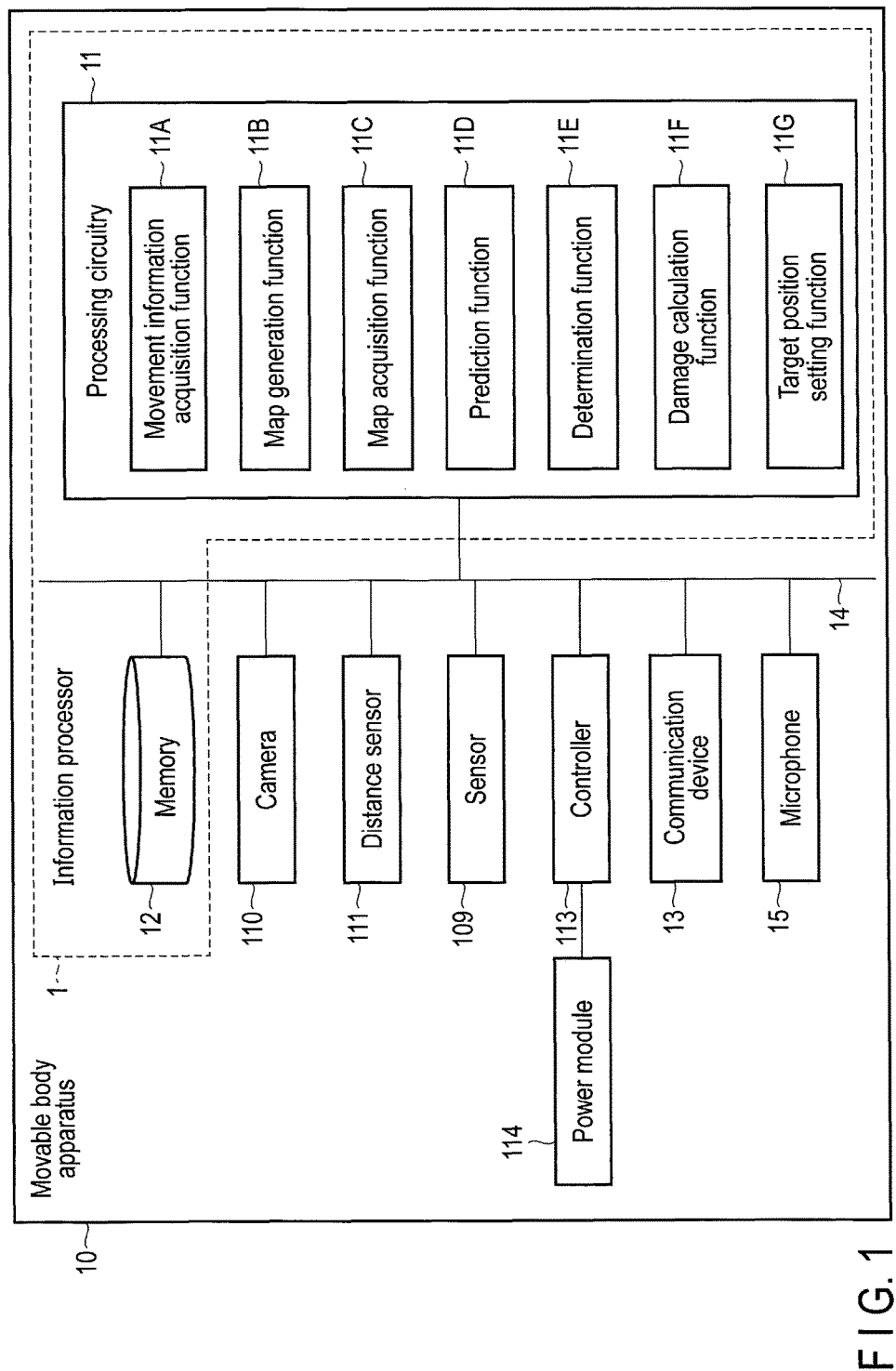
F I G. 1

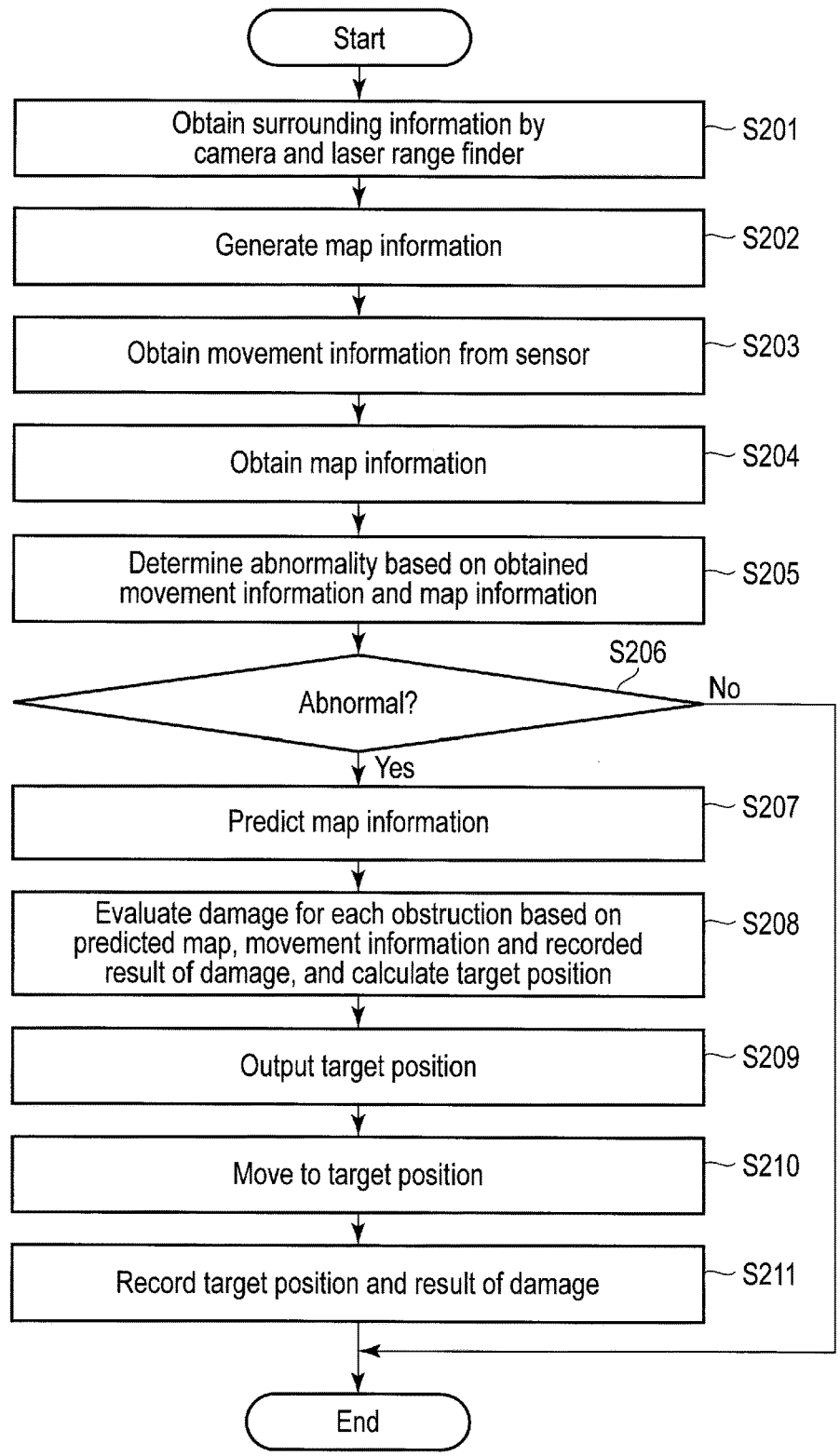
F I G. 4

Result of extraction of each obstruction from map information and evaluation value for each obstruction

| ID | Type | Score of damage caused to obstruction | Score of damage caused to movable body apparatus |
|---|---|---|---|
| A | Sofa | 2 | 1 |
| B | TV | 100 | 10 |
| C | Wall | 10 | 50 |
| D | Fireplace | 50 | 1000 |

Evaluation not performed for obstructions without movement path for collision

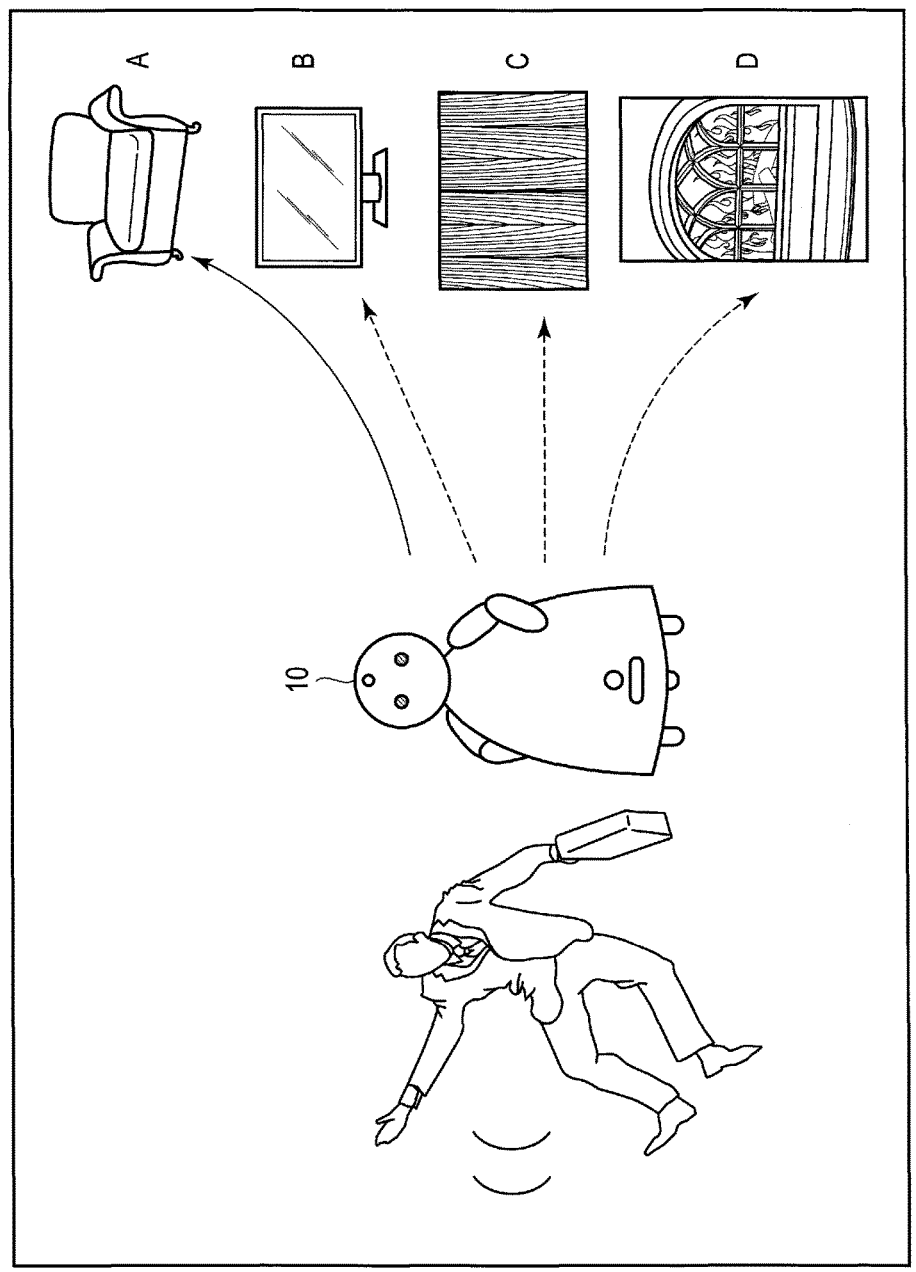
F I G. 9

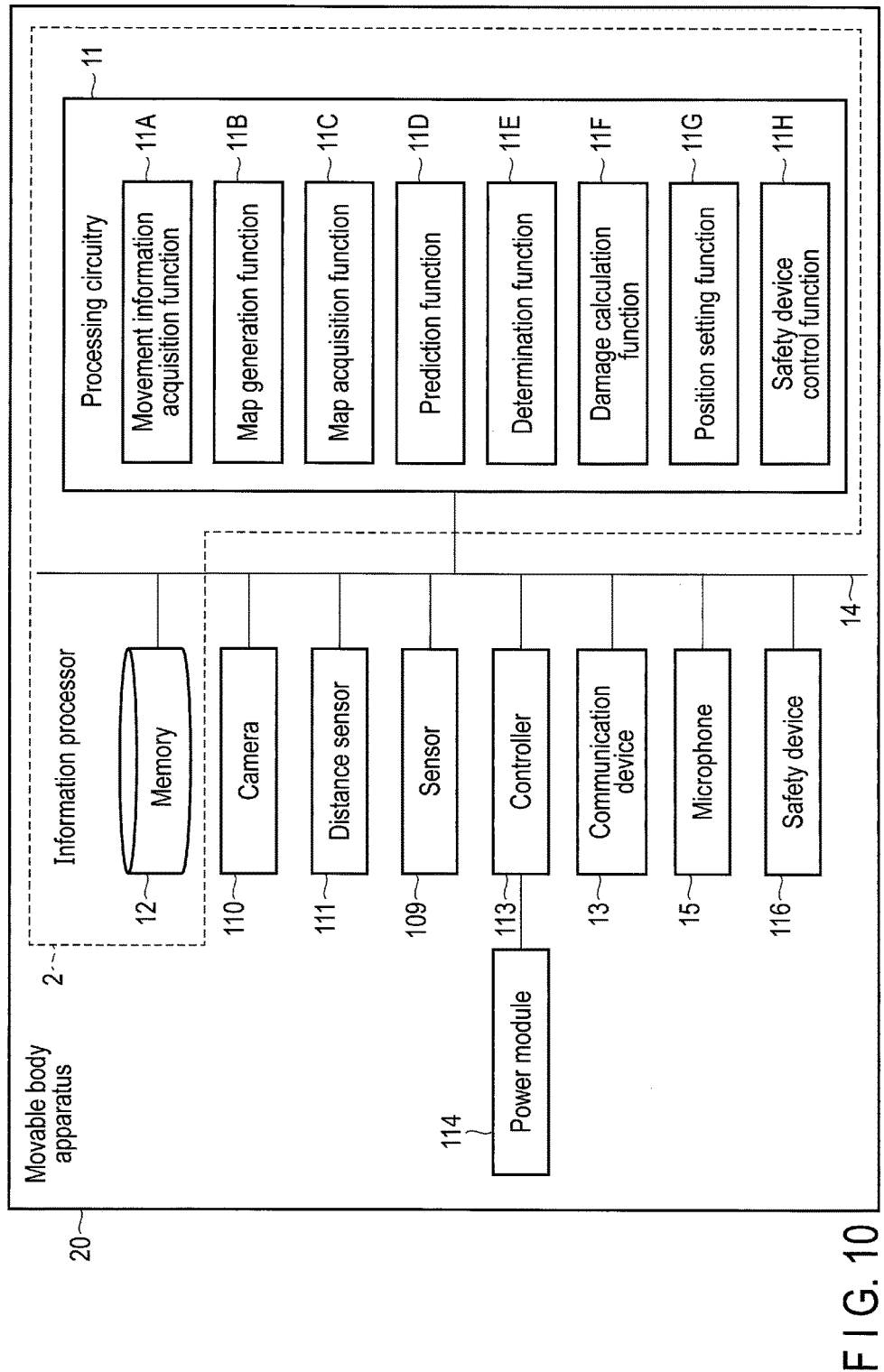
F I G. 10

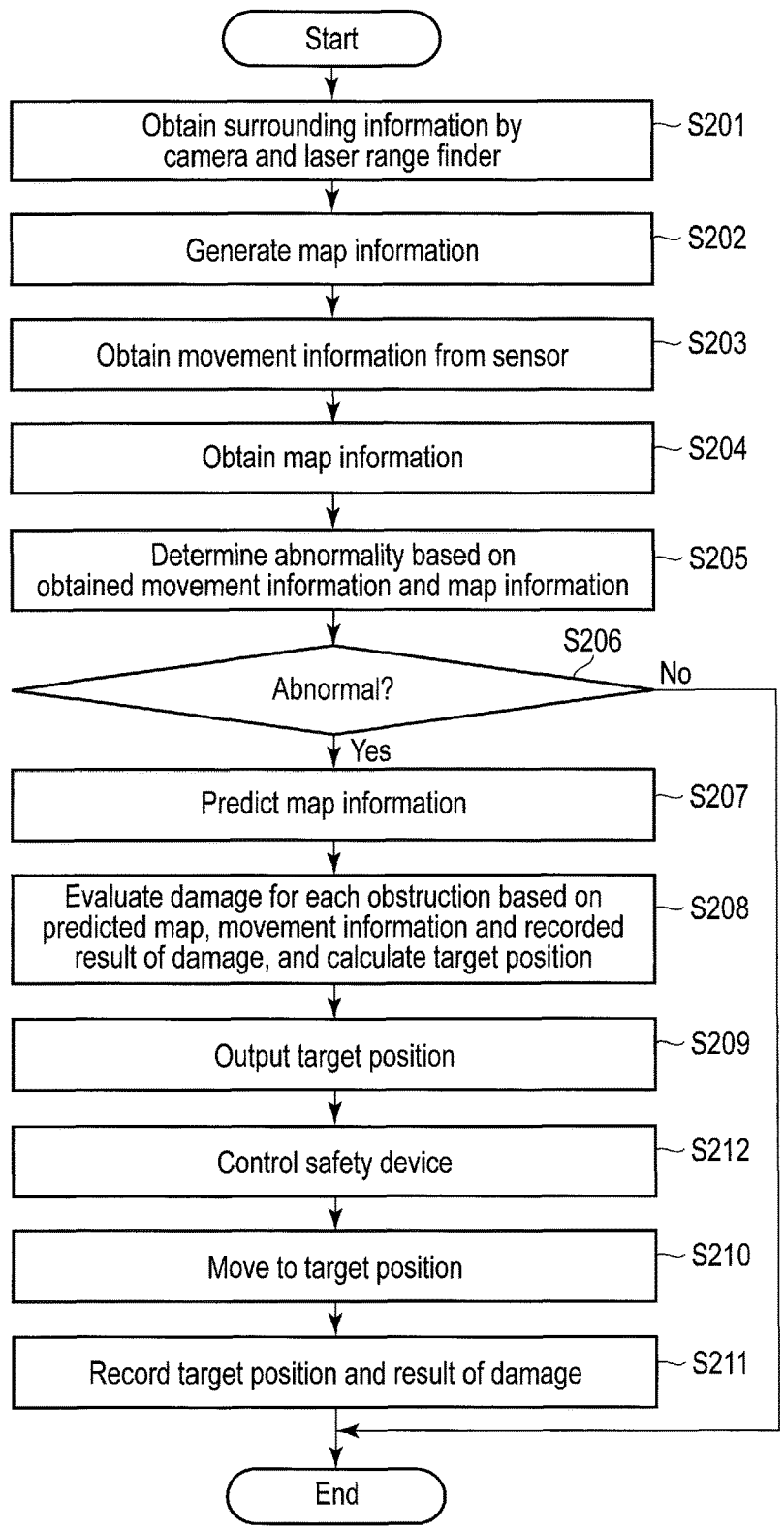
F I G. 12

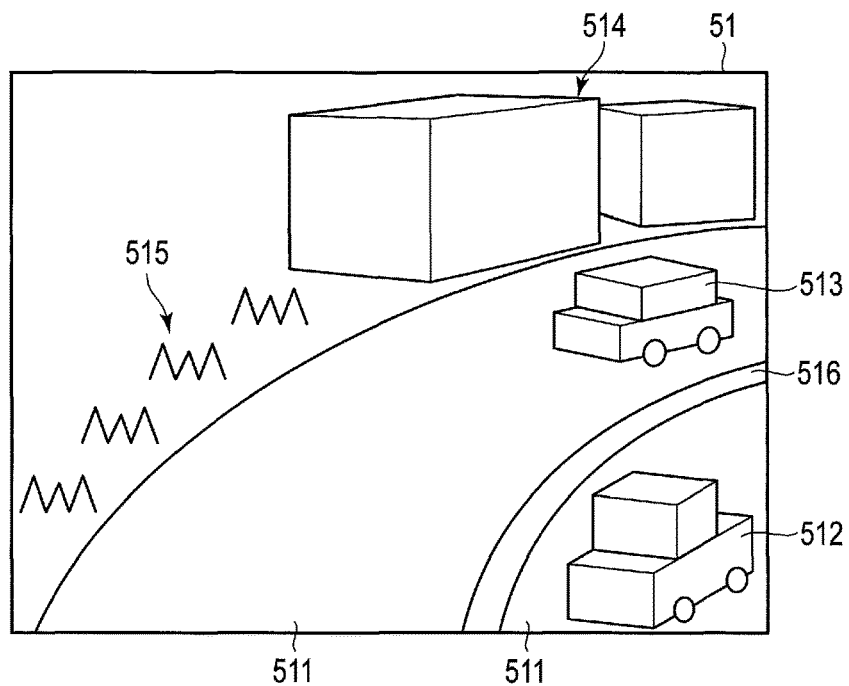
F I G. 13
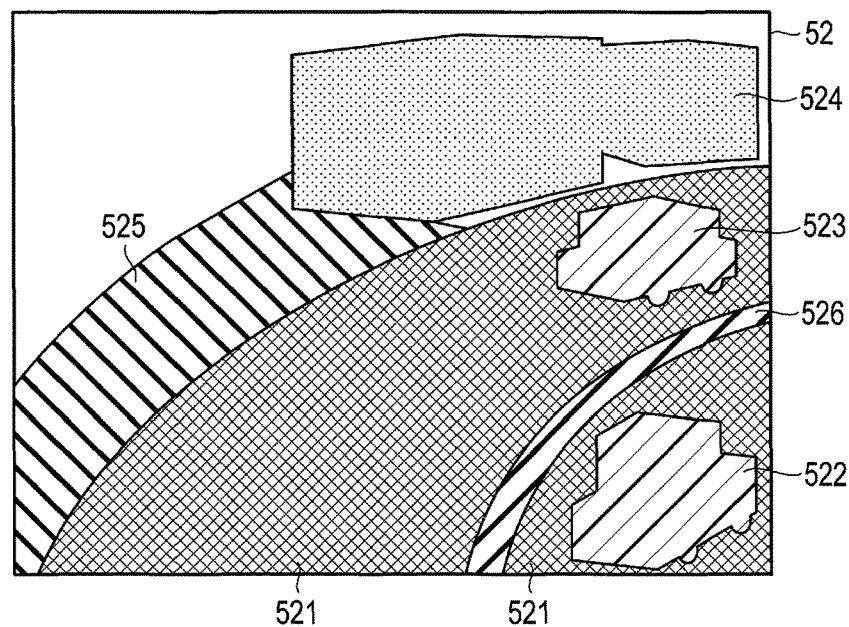
F I G. 14

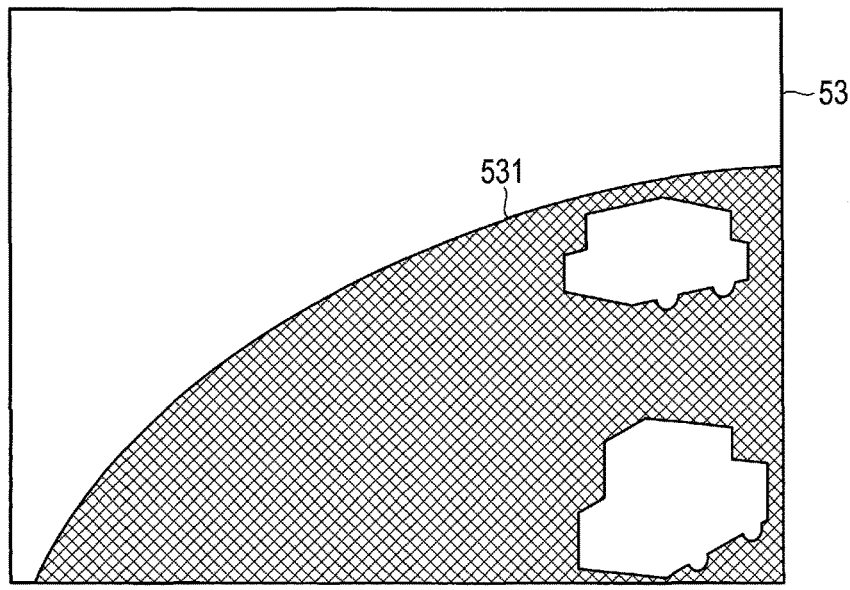
F I G. 15
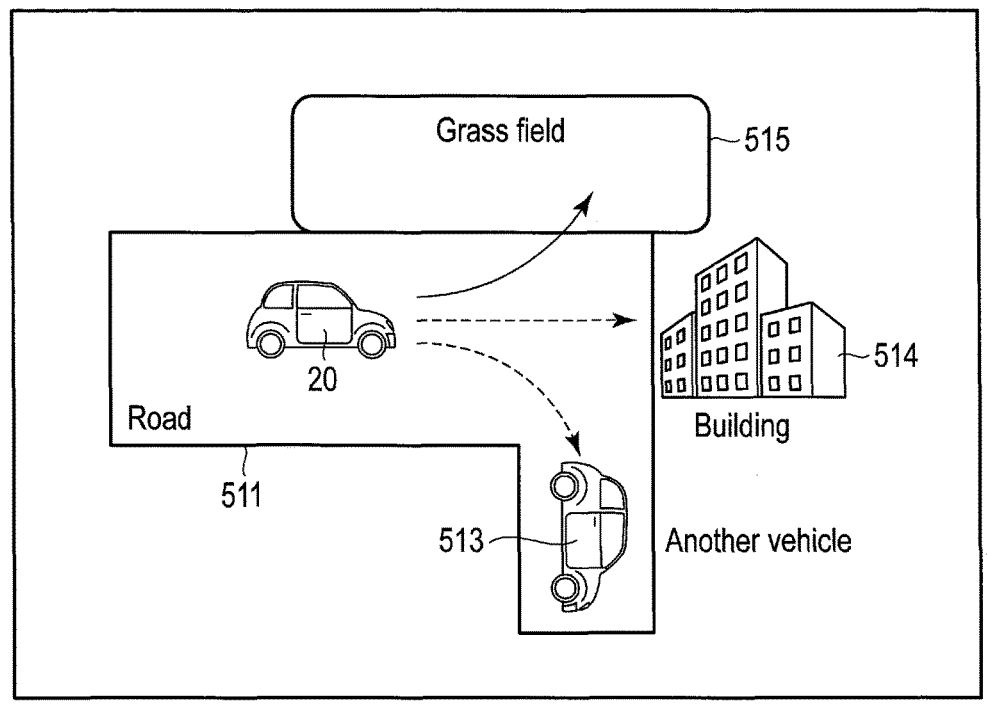
F I G. 16

INFORMATION PROCESSOR AND MOVABLE BODY APPARATUS

CROSS-REFERENCE TO RELATED APPLICATIONS

This application is based upon and claims the benefit of priority from Japanese Patent Application No. 2016-106120, filed May 27, 2016, the entire contents of which are incorporated herein by reference.

FIELD

Embodiments described herein relate generally to an information processor and a movable body apparatus for reducing damage from collision.

BACKGROUND

Recent years have seen the development of technologies for calculating a traveling route for emergency by a driver assistance system or an autonomous driving function when an imminent collision is recognized for the self vehicle.

The technologies allow avoidance or reduction of human injury or product damage by determining the traveling route for emergency in consideration of the track of each object different from the self vehicle.

However, the traveling route for emergency is determined without considering the presence or absence of any route toward each object other than the self vehicle, or the moving velocity of each object other than the self vehicle. Thus, the damage to be caused to the self vehicle or other objects cannot be sufficiently evaluated.

BRIEF DESCRIPTION OF THE DRAWINGS

FIG. 1 is an exemplary block diagram showing the system configuration of a movable body apparatus including an information processor according to a first embodiment.

FIG. 4 is a flowchart showing an example of the procedure of a process executed by the information processor of the first embodiment.

FIG. 9 is a view for explaining setting the target position of the movable body apparatus by the information processor of the first embodiment.

FIG. 10 is an exemplary block diagram showing the system configuration of a movable body apparatus including an information processor according to a second embodiment.

FIG. 12 is a flowchart showing an example of the procedure of a process executed by the information processor of the second embodiment.

FIG. 13 shows an example of an image captured by a camera provided in the movable body apparatus of FIG. 10.

FIG. 14 shows an example of a result of identification for objects on the image of FIG. 13.

FIG. 15 shows an example of a movable area on map information obtained by using the result of identification for the objects of FIG. 14.

FIG. 16 is a view for explaining setting the target position of the movable body apparatus by the information processor of the second embodiment.

DETAILED DESCRIPTION

Figure 2:
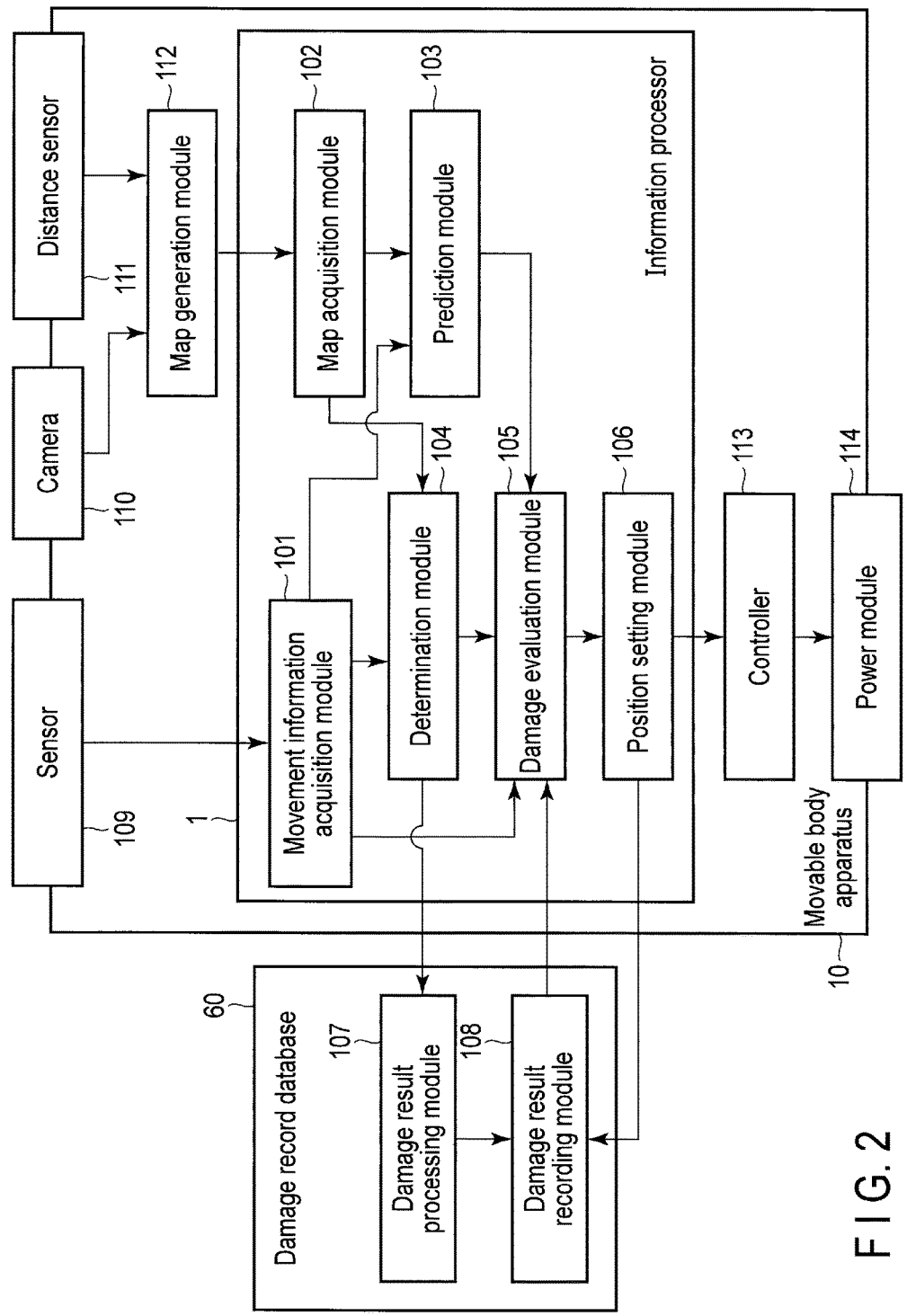
FIG. 2 is an exemplary block diagram shown for explaining the functional configuration of the information processor of the first embodiment.

In general, according to one embodiment, an information processor includes a memory and processing circuitry. The processing circuitry receives area information indicating a second area in a first area around a movable body apparatus and third areas in the first area. The movable body apparatus is movable in the second area. The object is present in each of the third areas. The processing circuitry receives movement information comprising at least one of a velocity, a movement direction or an acceleration of the movable body apparatus. The processing circuitry acquires evaluation values each indicative of a damage to be caused when the movable body apparatus collides with each object in the third areas. The processing circuitry determines, based on the evaluation values, a position corresponding to a first object which causes a least damage.

First Embodiment

With reference to FIG. 1, this specification explains the system configuration of a movable body apparatus 10 connected to an information processor 1 according to a first embodiment. The movable body apparatus 10 may be realized as a movable robot (autonomous movable apparatus), various types of vehicles or an airplane. The vehicles include, for example, a four-wheel vehicle and a two-wheel vehicle. The airplane is, for example, an unmanned aerial vehicle, a probe vehicle or a drone. In the present embodiment, the movable body apparatus 10 is assumed to be a robot. The information processor 1 may be realized as a dedicated purpose or general-purpose computer, or a built-in system incorporated into various types of electronic devices. The information processor 1 has a function for reducing the damage to be caused by collision between the movable body apparatus 10 and another object. The information processor 1 may be provided either inside or outside the movable body apparatus 10. When the information processor 1 is provided outside the movable body apparatus 10, the information processor 1 realizes the function for reducing the damage to be caused by collision by communicating with the movable body apparatus 10. In the following descriptions, this specification assumes that the information processor 1 is provided inside the movable body apparatus 10.

The movable body apparatus 10 includes the information processor 1 including processing circuitry 11 and a memory 12, a communication device 13, a bus 14, a microphone 15, a sensor 109, a camera 110, a distance sensor 111, a controller 113, a power module 114, etc. The processing circuitry 11, the memory 12, the communication device 13, the microphone 15, the sensor 109, the camera 110, the distance sensor 111, and the controller 113 may communicate with each other via the bus 14.

The processing circuitry 11 includes a movement information acquisition function 11A, a map generation function 11B, a map acquisition function 11C, a prediction function 11D, a determination function 11E, a damage calculation function 11F, and a target position setting function 11G. These processing functions 11A to 11G are stored in the memory 12 as programs executable by a computer. The processing circuitry 11 is a processor which realizes a function corresponding to each program by reading the program from the memory 12 and executing the program. In a state where the programs are read, the processing circuitry 11 includes the above functions 11A to 11G. FIG. 1 shows that processes corresponding to the movement information acquisition function 11A, the map generation function 11B, the map acquisition function 11C, the prediction function 11D, the determination function 11E, the damage calculation function 11F, and the position setting function 11G are realized in the processing circuitry 11 including a single processor. However, the processing circuitry 11 may be structured by combining multiple independent processors. Thus, each of the functions may be realized when a corresponding processor executes a program. Each processing function may be configured as a program, and the programs may be executed by single processing circuitry. Alternatively, a specific function may be implemented on dedicated independent program execution circuitry.

The movement information acquisition function 11A, the map generation function 11B, the map acquisition function 11C, the prediction function 11D, the determination function 11E, the damage calculation function 11F, and the position setting function 11G in the processing circuitry 11 are examples of a movement information acquisition module 101, a map generation module 112, a map acquisition module 102, a prediction module 103, a determination module 104, a damage evaluation module 105, and a position setting module 106, respectively, as described later.

The term "processor" used in the above explanation refers to, for example, a central processing unit (CPU), a graphical processing unit (GPU), an application-specific integrated circuit (ASIC) or a circuit for a programmable logic device. The programmable logic device is, for example, a simple programmable logic device (SPLD), a complex programmable logic device (CPLD) or a field programmable gate array (FPGA). A processor realizes a function by reading and executing a program stored in the memory 12. Instead of storing a program in the memory 12, the program may be directly incorporated into the circuit of the processor. In this case, the processor realizes a function by reading and executing the program incorporated into the circuit.

The memory 12 stores data, etc., as needed in connection with each processing function performed by the processing circuitry 11. In the present embodiment, the memory 12 stores, for example, programs, and data obtained by the camera 110, the sensor 109, the distance sensor 111, and the microphone 15. For example, the memory 12 is a semiconductor memory element such as a random access memory (RAM) or a flash memory, a hard disk or an optical disc. Various types of data in the memory 12 may be stored in a storage device outside the movable body apparatus 10. The memory 12 may be a storage medium which stores or temporarily stores a program transmitted via connection based on various types of communication schemes, such as a wired or wireless local area network (LAN) or 3G/4G mobile communication, from a server (not shown) on a network 5. The server on the network 5 is, for example, a server on the Internet. More than one storage medium may be provided. The present embodiment also includes a case where the above data is stored in multiple mediums. Either structure may be employed.

The controller 113 controls the power module 114 structured by a motor, wheels, etc., (not shown) such that the movable body apparatus 10 goes to the set target position. The controller 113 controls, for example, the number of revolutions of the motor and/or the direction of the wheels.

The sensor 109 measures the position and/or the amount of movement of the movable body apparatus 10. The sensor 109 is mounted on, for example, the axis of the wheels connected to the motor as the power module 114. The sensor 109 is, for example, a sensor that measures the number of revolutions of the wheels, a gyro sensor, a GPS receiver, and/or an acceleration sensor. The sensor 109 outputs movement information related to the movement of the movable body apparatus 10. For example, the movement information includes the velocity, the direction of movement and/or the acceleration of the movable body apparatus 10. The movement information may further include the inclination of the movable body apparatus 10 and the number of revolutions of the wheels of the movable body apparatus 10.

The camera 110 generates an image at least including a part of the vicinity of the movable body apparatus 10. The image captured by the camera 110 may be a photograph in a visible light range or a photograph in a wavelength range outside visible light. As an image using a wavelength range outside visible light, for example, an infrared image may be generated. The image generated by the camera 110 may be a still image or a moving image.

The distance sensor 111 generates distance data by measuring the distance to an object present around the movable body apparatus 10. In the present embodiment, the distance data is data including three-dimensional information. However, the distance data is not limited to this example. When the sensor 111 performs one-dimensional scanning, the distance data may be two-dimensional data. For the distance sensor 111, for example, a laser range finder, a lidar or a milli-meter wave laser is used.

The communication device 13 is configured to perform wired or wireless communication with another device. The communication device 13 includes a transmitter which transmits a signal, and a receiver which receives a signal. The microphone 15 obtains sound around the movable body apparatus 10 and outputs an audio signal corresponding to the obtained sound.

With reference to FIG. 2, this specification explains an example of the functional configuration of the information processor 1. The information processor 1 includes the movement information acquisition module 101, the map acquisition module 102, the prediction module 103, the determination module 104, the damage evaluation module 105, and the position setting module 106. These modules 101 to 106 may be realized as functional configuration of programs executed by the processing circuitry 11. The movable body apparatus 10 includes the sensor 109, the camera 110, the distance sensor 111 and, the map generation module 112 for inputting information related to the environment around the movable body apparatus 10 to the information processor 1.

The movement information acquisition module 101 obtains (receives) movement information related to the movement of the movable body apparatus 10 from the sensor 109. The movement information includes, regarding the movable body apparatus 10, the velocity, the direction of movement, the acceleration, the direction of acceleration, the inclination, the number of revolutions of the wheels, etc. The map acquisition module 102 obtains (receives), from the map generation module 112, map information indicating the movable area and/or the distribution of obstructions around the movable body apparatus 10. In the following explanation, the map information is also called area information. The determination module 104 determines whether the movement state of the movable body apparatus 10 is abnormal, such as slip or rear-end collision, by using the movement information. Alternatively, the determination module 104 determines whether there is a possibility of collision with an obstruction, by using map information. The prediction module 103 predicts map information for a specified time after the current time, using movement information and map information. When the determination module 104 determines that the movement state of the movable body apparatus 10 is abnormal, the damage evaluation module 105 calculates, by using movement information, a damage evaluation value for each obstruction extracted from the current map information or the predicted map information for the specified time after the current time with regard to collision with the obstruction. The damage evaluation module 105 calculates the target position indicating the least damage evaluation value. The position setting module 106 transmits the target position to the controller 113.

Moreover, the information processor 1 calculates a damage evaluation value in the damage evaluation module 105 and records the damage caused by movement by communicating with a damage record database 60 provided inside or outside the movable body apparatus 10. The damage record database 60 includes a damage result processing module 107 which obtains (receives) damage information generated as a result of movement, and a damage result recording module 108 which is a storage medium for recoding the result of movement and the result of damage.

Figure 3:
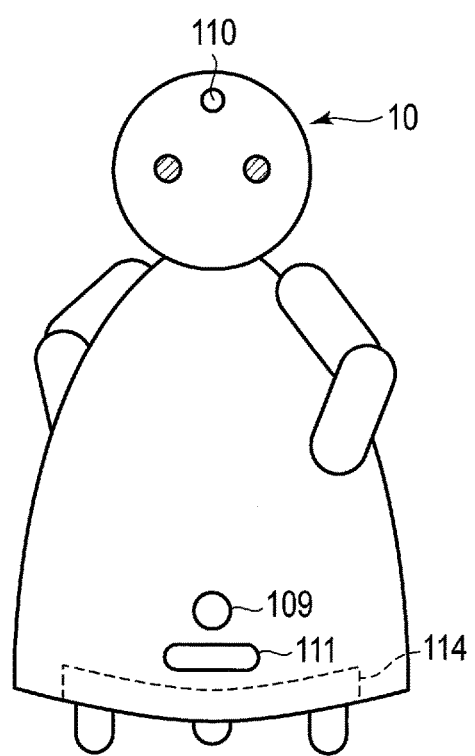
FIG. 3 is a perspective illustration showing an example of the external appearance of the movable body apparatus of FIG. 1.

FIG. 3 shows an example of the external appearance of the movable body apparatus 10. In the example of FIG. 3, the movable body apparatus 10 is realized as a movable robot. For example, the camera 110, the sensor 109 and the distance sensor 111 are provided at positions exposed from the surface of the movable body apparatus 10 to obtain the information around the movable body apparatus 10. The power module 114 for moving the movable body apparatus 10 including a motor and wheels (not shown) is provided in the lower part of the movable body apparatus 10. When the wheels in contact with the road surface or floor surface rotate, and the direction of the wheels is controlled, the movable body apparatus 10 is capable of moving in an arbitrary direction.

The map generation module 112 provided in the movable body apparatus 10 may be realized as processing circuitry which generates map information related to the environment around the movable body apparatus 10 based on the information obtained by the camera 110 and the distance sensor 111. The map generation module 112 may be provided inside the information processor 1.

The flowchart of FIG. 4 shows an example of the procedure of a process executed by the processing circuitry 11. For the sake of convenience, the flowchart includes the procedure of a process executed by the movable body apparatus 10.

The camera 110 and the distance sensor 111 provided in the movable body apparatus 10 obtain information around the movable body apparatus 10 (step S201). The camera 110 generates an image in which the vicinity of the movable body apparatus 10 is captured. The distance sensor 111 generates distance data indicating the measured distance to various objects present around the movable body apparatus 10.

Subsequently, the map generation module 112 of the movable body apparatus 10 generates map information based on the information around the movable body apparatus 10 obtained by the camera 110 and the distance sensor 111 (step S202). The map information may be generated by the processing circuitry 11.

The movement information acquisition module 101 of the information processor 1 obtains movement information from the sensor 109 of the movable body apparatus 10 (step S203). The map acquisition module 102 obtains map information from the map generation module 112 (step S204).

Subsequently, the determination module 104 determines whether the movement state of the movable body apparatus 10 is abnormal, by using the obtained movement information and map information (step S205). The determination module 104 may determine whether the movement state of the movable body apparatus 10 is abnormal, by using only the movement information. For example, the determination module 104 detects an abnormal movement state of the movable body apparatus 10 caused by slip or rear-end collision, by using the movement information. Alternatively, the determination module 104 determines whether there is a possibility that the movable body apparatus 10 collides with any object around the movable body apparatus 10, by additionally using the map information.

When the determination module 104 determines that the movement state of the movable body apparatus 10 is not abnormal (No in step S206), in other words, when the determination module 104 determines that the movement state of the movable body apparatus 10 is normal, the information processor 1 terminates the process.

When the determination module 104 determines that the movement state of the movable body apparatus 10 is abnormal (Yes in step S206), the prediction module 103 predicts map information for a first time after the current time (step S207). The first time may be a predetermined time such as several seconds, or a predicted time until collision based on the moving velocity of the movable body apparatus 10 and the moving velocity of each obstruction. The damage evaluation module 105 calculates a damage evaluation value for each obstruction extracted from the predicted map information by using movement information when the movable body apparatus 10 collides with the obstruction, and calculates the target position indicating the least damage evaluation value (step S208). For example, the damage evaluation module 105 sets a position corresponding to an obstruction in which the calculated damage evaluation value is the least as the target position for the movement of the movable body apparatus 10. The position setting module 106 outputs the target position to the movable body apparatus 10 (step S209).

The movable body apparatus 10 moves to the target position output by the position setting module 106 (step S210).

When the movable body apparatus 10 reaches the target position and collides with the obstruction located at the target position, the damage result processing module 107 of the damage result record database 60 records, in the damage result recording module 108, the target position, the obstruction located at the target position, and the result of damage caused by the collision to the movable body apparatus 10 and the obstruction (step S211), and terminates the process. All the above information may not be recorded in the damage result recording module 108.

For example, the order of steps S203 and S204 is not limited to that in the flowchart of FIG. 4.

Now, this specification explains the details of the operation of each module of the information processor 1.

The movement information acquisition module 101 obtains the movement information output by the sensor 109. As described above, the movement information includes, for example, the velocity, the direction of movement and/or the acceleration of the movable body apparatus 10. The movement information may further include the inclination of the movable body apparatus 10, the number of revolutions of the wheels included in the power module 114 of the movable body apparatus 10, etc.

The map generation module 112 generates map information related to the environment around the movable body apparatus 10, by using the image generated by the camera 110 and the distance data generated by the distance sensor 111.

Figure 5:
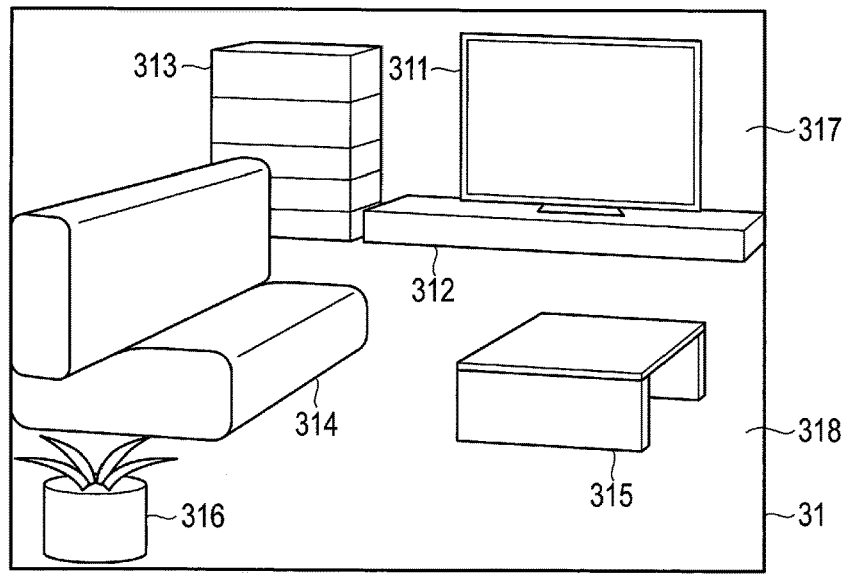
FIG. 5 shows an example of an image captured by a camera provided in the movable body apparatus of FIG. 1.
Figure 6:
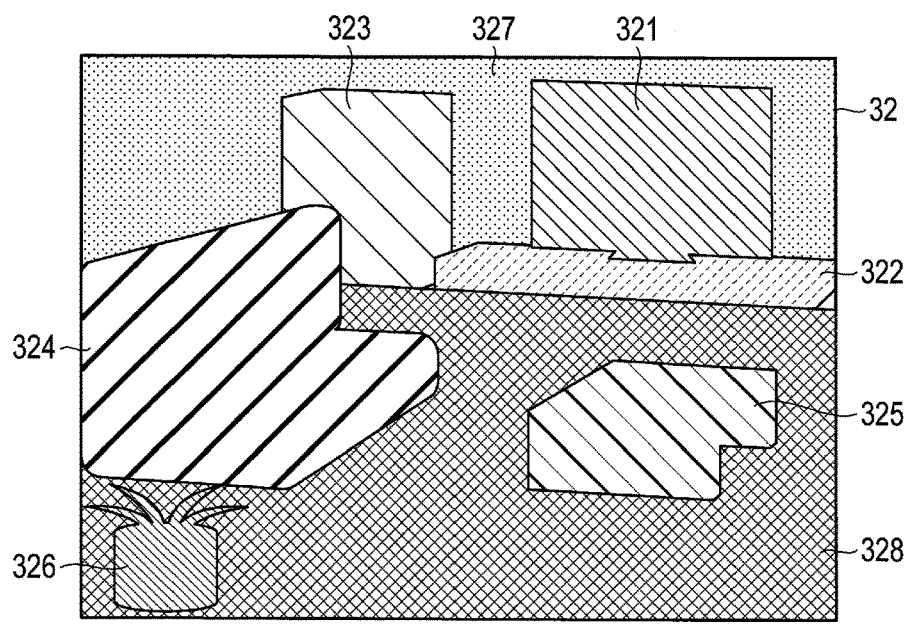
FIG. 6 shows an example of a result of identification for objects on the image of FIG. 5.
Figures 7, 8:
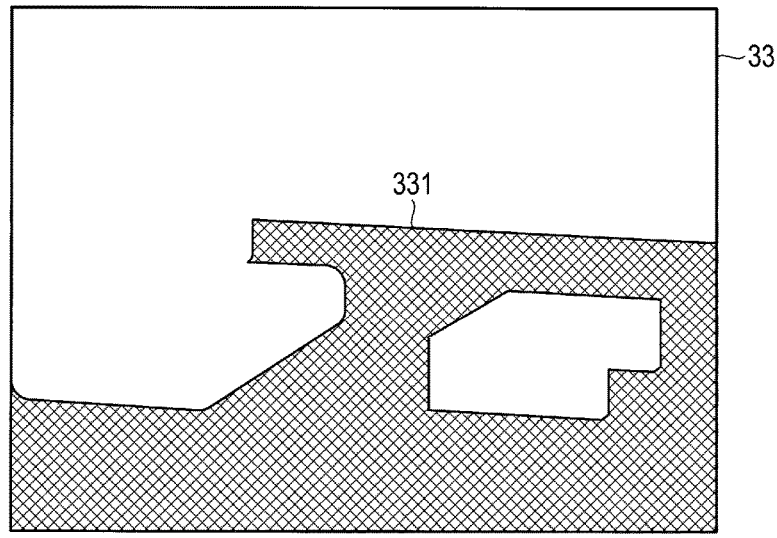
FIG. 7 shows an example of a movable area on map information obtained by using the result of identification for the objects of FIG. 6.
FIG. 8 shows an example of a damage evaluation table used by the information processor of the first embodiment.

Now, this specification explains an example in which map information is generated, referring to FIG. 5 to FIG. 7. FIG. 5 shows an image 31 captured by the camera 110 when the movable body apparatus 10 moves in a room. The image 31 includes objects 311 to 318, for example, a television 311, a sofa 314, a table 315, a wall 317, and a floor 318.

The map generation module 112 is capable of generating map information, using a technology for identifying each object in images, such as semantic segmentation. Semantic segmentation is a technology for using the image 31 captured by the camera 110 as input and identifying what each object in the image is based on the dictionary data obtained by learning. When the camera 110 captures the inside of a room, the identification categories include, for example, a floor, a carpet, a tatami mat, a wall, a chair, a desk, a window, a door, a human, a cat, and a dog. When the camera 110 captures the outside of a building, the identification categories include, for example, a roadway, a footway, a tree, a building, a vehicle, and a human. The dictionary data for identification is retained in the map generation module 112 in advance.

FIG. 6 shows a result of identification 32 in which the objects 311 to 318 in the image 31 are identified. The result of identification 32 shows areas 321 to 328. The areas 321 to 328 are identified using semantic segmentation by the map generation module 112, and correspond to the objects 311 to 318, respectively. When the result of identification 32 is used, it is possible to determine to which object a pixel on the image 31 corresponds. The map generation module 112 is also capable of determining whether an area corresponding to each of the identified objects is a movable area in which the movable body apparatus 10 is movable or an area of an obstruction to the movement of the movable body apparatus 10. For example, the area identified by the result of identification 32 as a floor, a carpet, a tatami mat, or a roadway may be a movable area. Of the identified objects 311 to 318, the map generation module 112 determines the area 328 corresponding to the floor 318 as a movable area, and determines the areas 321 to 327 corresponding to the other objects 311 to 317 as the areas of obstructions. The method for identifying each object on the image is not limited to semantic segmentation. Each object on the image may be identified in various ways.

Subsequently, the map generation module 112 generates a three-dimensional map regarding the objects present around the movable body apparatus 10 by combining the result of identification 32 and the distance data obtained by the distance sensor 111. The map generation module 112 is capable of combining the result of identification 32 and the distance data by, for example, obtaining the correspondence relationship between the image captured by the camera 110 and the distance data obtained by the distance sensor 111 and applying calibration. The generated map includes information for identifying the area of each object as well as information of the distance from the movable body apparatus 10 to each object in the generated map. The map is equivalent to map information indicating the movable area in which the movable body apparatus 10 is movable in a specific area around the movable body apparatus 10 and the area of each object which is an obstruction in the specific area. Thus, when the map information is used, it is possible to determine the movable area and an area corresponding to each obstruction. For example, as shown in FIG. 7, the map generation module 112 is capable of extracting a three-dimensional map 33 corresponding to the movable area 331 from the map information. In a similar manner, the map generation module 112 is also capable of extracting a three-dimensional map corresponding to the area of each obstruction from the map information.

The map acquisition module 102 obtains the map information output by the map generation module 112. The map information may be generated as needed, or may be generated when the abnormality of the movement state of the movable body apparatus 10 is detected.

The determination module 104 determines whether the movement state of the movable body apparatus 10 is abnormal. Specifically, the determination module 104 determines abnormality such as slip or rear-end collision, using movement information. For example, the determination module 104 determines that the movement state of the movable body apparatus 10 is abnormal based on movement information when the acceleration is greater than or equal to a threshold, or when the change of acceleration does not correspond to that of the number of revolutions of tires, or when the velocity is greater than or equal to a threshold, or when the inclination of the movable body apparatus 10 is greater than or equal to a threshold, or when the number of revolutions of tires is greater than or equal to a threshold.

Alternatively, the determination module 104 determines whether there is a possibility that the movable body apparatus 10 collides with any obstruction, using movement information and map information. For example, the determination module 104 predicts the position of the movable body apparatus 10 a certain time after the current time, using movement information. The determination module 104 determines whether the predicted position is a position where the movable body apparatus 10 collides with an obstruction, using map information. When there is a possibility that the movable body apparatus 10 collides with any obstruction, the determination module 104 determines that the movement state of the movable body apparatus 10 is abnormal.

The determination module 104 may determine whether there is a possibility that a moving object around the movable body apparatus 10 collides with the movable body apparatus 10, by using movement information and map information. When the determination module 104 determines that there is a possibility that the moving object collides with the movable body apparatus 10, the determination module 104 determines that the movement state of the movable body apparatus 10 is abnormal. For example, this case is equivalent to a case where the obstruction is located near the movable body apparatus 10 in map information, and further, the direction of movement of the obstruction faces the movable body apparatus 10. When the obstruction is located near the movable body apparatus 10, for example, the distance from the obstruction to the movable body apparatus 10 is less than or equal to a threshold distance. For example, the determination module 104 is capable of using time-series map information items and detecting the position of an obstruction in each map information item. The determination module 104 is capable of determining whether the obstruction is moving based on the difference in the position between the maps and the movement information of the movable body apparatus 10. When the determination module 104 determines that the obstruction is moving, the determination module 104 may determine that the obstruction is a moving object such as a human, animal or automobile. When the determination module 104 determines that the obstruction is not moving, the determination module 104 may determine that the obstruction is a still object such as a wall, sofa or building. The determination module 104 may retain in advance information indicating whether each object is a moving object or a still object. The determination module 104 is also capable of calculating the moving velocity or the direction of movement of the obstruction. Thus, when the determination module 104 determines that an obstruction is moving, the determination module 104 is capable of determining whether there is a possibility that the moving obstruction collides with the movable body apparatus 10.

The prediction module 103 predicts map information for the first time after the current time, using movement information and current map information. The prediction module 103 predicts the movable area in which the movable body apparatus 10 is movable in a specific area around the movable body apparatus 10 and areas in which obstructions are present in the specific area the first time after the current time, using movement information and current map information. The predicted map information indicates the position of each obstruction included in the current map information with respect to the movable body apparatus 10 at a future time based on the movement information of the movable body apparatus 10. When an obstruction included in the map information is a moving object such as a human, the prediction module 103 predicts the position of the obstruction as a moving object at a future time, using the moving velocity of the obstruction. The prediction module 103 outputs the map information obtained from the above prediction to the damage evaluation module 105.

The prediction module 103 may not be provided in the information processor 1. In this case, the map information received by the map acquisition module 102 is straightly output to the damage evaluation module 105. The map information to be used by the damage evaluation module 105 may be the current map information received by the map acquisition module 102, or may be the map information for the first time later predicted by the prediction module 103.

When the movement state of the movable body apparatus 10 is abnormal, the damage evaluation module 105 determines whether a movement path for allowing the movable body apparatus 10 to reach each of obstructions is present, using movement information and map information. The damage evaluation module 105 obtains an evaluation value indicating the damage to be caused when the movable body apparatus 10 collides with each obstruction having a movement path. The damage evaluation module 105 determines a position corresponding to the object indicating the least damage as the target position for the movement of the movable body apparatus 10 based on the obtained evaluation values.

More specifically, when the determination module 104 determines that the movement state of the movable body apparatus 10 is abnormal, the damage evaluation module 105 determines whether there is a movement path for allowing the movable body apparatus 10 to reach each of the obstructions indicated in map information, using movement information and map information. In other words, the damage evaluation module 105 determines whether the movable body apparatus 10 can reach each of the obstructions indicated in map information. When the entire path for the movable body apparatus 10 to an obstruction is included in the movable area, the movable body apparatus 10 can reach the obstruction. When at least a part of the path for the movable body apparatus 10 to an obstruction is included in an area corresponding to any obstruction, the movable body apparatus 10 cannot reach the obstruction.

Subsequently, the damage evaluation module 105 calculates an evaluation value indicating the damage to be caused when the movable body apparatus 10 collides with each object having a movement path. The damage evaluation module 105 determines a position corresponding to the obstruction in which the calculated evaluation value is the least as the target position for the movement of the movable body apparatus 10.

More specifically, the damage evaluation module 105 reads in advance the damage evaluation table shown in FIG. 8 from the damage result recording module 108 of the damage record database 60. The damage evaluation table recorded by the damage result recording module 108 includes entries corresponding to obstructions. Each entry includes, for example, an ID, a type, a score of a damage caused to an obstruction, and a score of a damage caused to the movable body apparatus 10. In an entry corresponding to an obstruction, the ID indicates the identification information given to the obstruction. The type indicates the type of the obstruction. For example, the type is set to the category as a result of identification for the object as an obstruction. The score of the damage caused to the obstruction indicates the extent of the damage to be caused to the obstruction when the movable body apparatus 10 collides with the obstruction. When the obstruction is easily destroyed by collision, the score of the damage caused to the obstruction is set so as to be high. When the obstruction is difficult to destroy even at the time of collision, the score of the damage caused to the obstruction is set so as to be low. When the obstruction is a living thing such as a human, the score of the damage caused to the obstruction may be set to a value indicating that the movable body apparatus 10 must not collide with the obstruction. The score of the damage caused to the movable body apparatus 10 indicates the extent of the damage to be caused to the movable body apparatus 10 when the movable body apparatus 10 collides with the obstruction. When the movable body apparatus 10 is easily damaged by the collision with the obstruction, the score of the damage caused to the movable body apparatus 10 is set so as to be high. When the movable body apparatus 10 is difficult to damage, the score of the damage caused to the movable body apparatus 10 is set so as to be low. No ID may be included in each entry such that the entry is identified only based on the type of the obstruction.

Even when the types of obstructions are the same, the score of the damage caused to the obstruction or the score of the damage caused to the movable body apparatus 10 may differ depending on the environment of the movable body apparatus 10. Alternatively, entries corresponding to obstructions which are of the same type may be included in the damage evaluation table such that the score of the damage caused to the obstruction or the score of the damage caused to the movable body apparatus 10 differs depending on the entry. For example, when two obstructions are of the same type "sofa", the score of the damage caused to the expensive sofa may be set so as to be high, and the score of the damage caused to the cheap sofa may be set so as to be low.

As described above, the damage evaluation module 105 determines whether there is a movement path for allowing the movable body apparatus 10 to reach each of the obstructions indicated in map information, using the map information. In other words, the damage evaluation module 105 determines whether the movable body apparatus 10 can reach each of the obstructions indicated in map information.

The damage evaluation module 105 calculates the score of the damage caused to each reachable obstruction and the score of the damage caused to the movable body apparatus 10 for each reachable obstruction. The damage evaluation module 105 obtains the score of the damage caused to the obstruction and the score of the damage caused to the movable body apparatus 10 for the obstruction by extracting an entry corresponding to each reachable obstruction as shown in FIG. 8 from the damage evaluation table read from the damage result recording module 108. The damage evaluation table shown in FIG. 8 includes entries corresponding to, of the obstructions indicated in map information, obstructions each having a movement path through which the movable body apparatus 10 can reach the obstruction.

The damage evaluation module 105 selects the obstruction indicating that the damage to be caused when the movable body apparatus 10 collides with the obstruction is the least from the reachable obstructions based on the obtained scores of the damage caused to the obstructions and the obtained scores of the damage caused to the movable body apparatus 10. The damage evaluation module 105 sets a position corresponding to the selected obstruction as the target position for the movement of the movable body apparatus 10. For example, the damage evaluation module 105 calculates a position corresponding to the obstruction having the least score of the damage caused to the obstruction and a less score of the damage caused to the movable body apparatus 10 as the target position.

The damage evaluation module 105 may calculate an evaluation value based on the score of the damage caused to an obstruction and the score of the damage caused to the movable body apparatus 10 for the obstruction. The evaluation value is calculated by performing weighted adding with the score of the damage caused to the obstruction and the score of the damage caused to the movable body apparatus 10. The greater the evaluation value is, the greater the damage caused by the collision with the obstruction is. The less the evaluation value is, the less the damage caused by the collision with the obstruction is. The damage evaluation module 105 may calculate an evaluation value, using the velocity of the movable body apparatus 10 and the velocity of each obstruction. In this case, for example, the damage evaluation module 105 calculates a greater evaluation value with increasing velocity of collision between the movable body apparatus 10 and the obstruction. The damage evaluation module 105 determines, based on the evaluation values, a position corresponding to the obstruction indicating the least damage as the target position for the movement of the movable body apparatus 10.

The position setting module 106 transmits the target position determined by the damage evaluation module 105 to the controller 113.

The controller 113 controls the power module 114 such that the movable body apparatus 10 goes to the target position. For example, the controller 113 controls the number of revolutions of the motor and the direction of the wheels.

FIG. 9 shows an example in which the movable body apparatus 10 is controlled so as to move to the target position when the movement state of the movable body apparatus 10 is abnormal as a result of determination. The damage evaluation module 105 obtains an evaluation value indicating the damage to be caused by the collision between the movable body apparatus 10 and each of a sofa, a television, a wall and a fireplace having a movement path as shown in FIG. 8 when the movement state is abnormal, for example, when a human runs into the movable body apparatus 10. As the evaluation value indicating the damage, one of the score of the damage caused to each obstruction and the score of the damage caused to the movable body apparatus 10 may be used, or both of them may be used. The damage evaluation module 105 calculates a position corresponding to the sofa indicating the least damage as the target position based on the obtained evaluation values. For example, the damage evaluation module 105 determines that movement corresponding to the obstruction indicating the least score of the damage caused to the obstruction and a less score of the damage caused to the movable body apparatus 10 will cause the least damage. The position setting module 106 outputs the calculated target position to the controller 113. The controller 113 controls the power module 114 such that the movable body apparatus 10 goes to the sofa located at the target position as shown in FIG. 9.

In the above manner, when the movement state is abnormal, the movable body apparatus 10 can be caused to move to a position which reduces the damage caused to the movable body apparatus 10 and other objects.

After the movable body apparatus 10 moves to the target position, the determination module 104 detects the collision with the obstruction. When the determination module 104 determines that the movable body apparatus 10 collides with the obstruction, the movable body apparatus 10 transitions to a damage reception state for recording the damage caused by the collision in the damage record database 60.

When one of the following conditions is met, or when multiple conditions of the following conditions are simultaneously met, or when a value obtained by multiplying the value detected in each condition by weight and adding them exceeds a predetermined threshold, the determination module 104 may determine that the movable body apparatus 10 collides with the obstruction.

In a first condition, by using the movement information obtained by the sensor 109, when the change of the acceleration of the movable body apparatus 10 is greater than or equal to a threshold, or when a loud impact noise is detected through the microphone 15, the movable body apparatus 10 is assumed to be subject to impact. In this case, the determination module 104 determines that the movable body apparatus 10 collides with the obstruction. In other words, the determination module 104 determines that the audio signal output by the microphone 15 corresponds to a loud impact noise.

In a second condition, by using the movement information obtained by the sensor 109, when the movable body apparatus 10 is located outside the movable area on map information at a past time, the determination module 104 determines that the movable body apparatus 10 collides with the obstruction, or that there is a possibility that the movable body apparatus 10 collides with the obstruction.

In a third condition, when the revolution of the wheels of the power module 114 is not detected by the sensor 109 although the controller 113 controls the power module 114 so as to move the movable body apparatus 10, the determination module 104 determines that the movable body apparatus 10 collides with the obstruction.

In a fourth condition, when the change of the position of the obstruction which is close to the movable body apparatus 10 on map information at a past time and is determined as a still object is detected, the determination module 104 determines that the movable body apparatus 10 collides with the obstruction.

In a fifth condition, by using the movement information obtained by the sensor 109, when the inclination of the movable body apparatus 10 calculated based on the acceleration is greater than or equal to a threshold, the movable body apparatus 10 is assumed to fall down. Thus, the determination module 104 determines that the movable body apparatus 10 collides with the obstruction.

When the determination module 104 determines that the movable body apparatus 10 collides with the obstruction, the determination module 104 transmits information related to the damage caused as a result of movement to the damage result processing module 107 of the damage record database 60. For example, the determination module 104 transmits, to the damage record database 60, the target position, an obstruction corresponding to the target position, movement information from the determination of the target position to the arrival at the target position, in other words, to the collision with the obstruction, damage result information indicating the damaged portions of the movable body apparatus 10 and the extent of the damage, etc. The movement information includes, for example, the velocity, the direction of movement, the acceleration, and/or the inclination. The determination module 104 may straightly transmit, to the damage record database 60, the information obtained at the time of collision and before and after the collision by various sensors provided in the movable body apparatus 10, such as the camera 110, the sensor 109, the distance sensor 111 and the microphone 15. Alternatively, the determination module 104 may transmit information obtained by analyzing the above various types of information to the damage record database 60. The determination module 104 obtains information indicating the extent of damage by analyzing the information obtained at the time of collision and before and after the collision.

The determination module 104 may transmit, to the damage record database 60, damage-related information input by the administrator, etc., using an input device provided in the movable body apparatus 10. The input device may be, for example, a touchscreen display or a keyboard. The administrator can input the result of damage such as the damaged portions of the movable body apparatus 10, the extent of the damage, the damaged portions of the obstruction and the extent of the damage, using the input device.

The damage result processing module 107 of the damage record database 60 receives the damage-related information transmitted from the determination module 104 of the movable body apparatus 10.

The damage result recording module 108 records the received information. When the movable body apparatus 10 collides with an object, the damage result recording module 108 records information indicating the object and the result of damage caused by the collision.

The damage result processing module 107 is capable of analyzing the information recorded in the damage result recording module 108, and generating a damage evaluation table to be recorded in the damage result recording module 108 or updating the damage evaluation table. For example, the damage result processing module 107 is capable of updating the evaluation value included in an entry corresponding to the object in the damage evaluation table by using the accumulated damage-related information of each object. For example, the evaluation value includes the score of the damage caused to the obstruction and the score of the damage caused to the movable body apparatus 10 explained with reference to FIG. 8. The information processor 1 using the damage evaluation table is capable of more appropriately determining an object and a target position for allowing the damage to be the least based on the updated damage evaluation table when the movement state of the movable body apparatus 10 is abnormal.

The function for detecting the collision between the movable body apparatus 10 and an object and obtaining the result of damage may be realized by a processor different from the determination module 104. For example, the damage result processing module 107 of the damage record database 60 may detect the collision between the movable body apparatus 10 and an object based on the movement information or the audio signal obtained on the movable body apparatus 10, and obtain the result of damage by data analysis and/or input with an input device. Further, the determination module 104 or the damage result processing module 107 may use the devices provided in the building in which the movable body apparatus 10 is allocated, such as a security camera or a sensor, to obtain the result of damage. For example, the determination module 104 or the damage result processing module 107 may obtain the result of damage, using the video obtained by the security camera or data obtained by the sensor.

As explained above, the present embodiment allows the movable body apparatus to move to a position which reduces the damage caused to the movable body apparatus and/or other objects when the movement state is abnormal. The map acquisition module 102 obtains area information indicating the movable area in which the movable body apparatus 10 is movable in a specific area around the movable body apparatus 10 and areas in which objects are present in the specific area. The movement information acquisition module 101 obtains movement information including the velocity, the direction of movement and/or the acceleration of the movable body apparatus 10. When the movement state of the movable body apparatus 10 is abnormal, and further when the specific area includes areas in which objects are present, the damage evaluation module 105 determines whether there is a movement path for allowing the movable body apparatus 10 to reach each of the objects present in the areas, using the movement information and the area information. The damage evaluation module 105 obtains an evaluation value indicating the damage to be caused when the movable body apparatus 10 collides with each of the objects having a movement path. The damage evaluation module 105 determines a position corresponding to the object which allows the damage to be the least as the target position for the movement of the movable body apparatus 10 based on the evaluation values. In this way, the movable body apparatus 10 can be caused to move to a position which reduces the damage caused to the movable body apparatus 10 and/or other objects.

In response to the collision between the movable body apparatus 10 and each object located at the target position, the damage evaluation information of the object is recorded in the damage record database 60. In this way, when the movement state of the movable body apparatus 10 is abnormal, the information processor 1 is capable of more appropriately determining the object for allowing the damage to be the least, using the recorded damage evaluation information of each object. When the movable body apparatus 10 is an industrial movable robot, the robot can avoid colliding with dangerous devices or combustible products provided in a factory, etc. When the movable body apparatus 10 is a guide movable robot, the robot can avoid colliding with walking customers or arranged products at a store, etc.

Second Embodiment

With reference to FIG. 10, this specification explains the system configuration of a movable body apparatus 20 connected to an information processor 2 according to a second embodiment. The movable body apparatus 20 may be realized as, for example, a vehicle on which people get. In addition to the structures of the movable body apparatus 10 of the first embodiment, the movable body apparatus 20 includes a safety device 116 for protecting passengers. The information processor 2 includes processing circuitry 11. The processing circuitry 11 includes a safety device control function 11H for controlling the safety device 116 in addition to the functions 11A to 11G explained in the first embodiment. The safety device 116 is, for example, a seatbelt or an airbag for protecting the passengers when the movable body apparatus 20 is subject to collision or impact.

Figure 11:
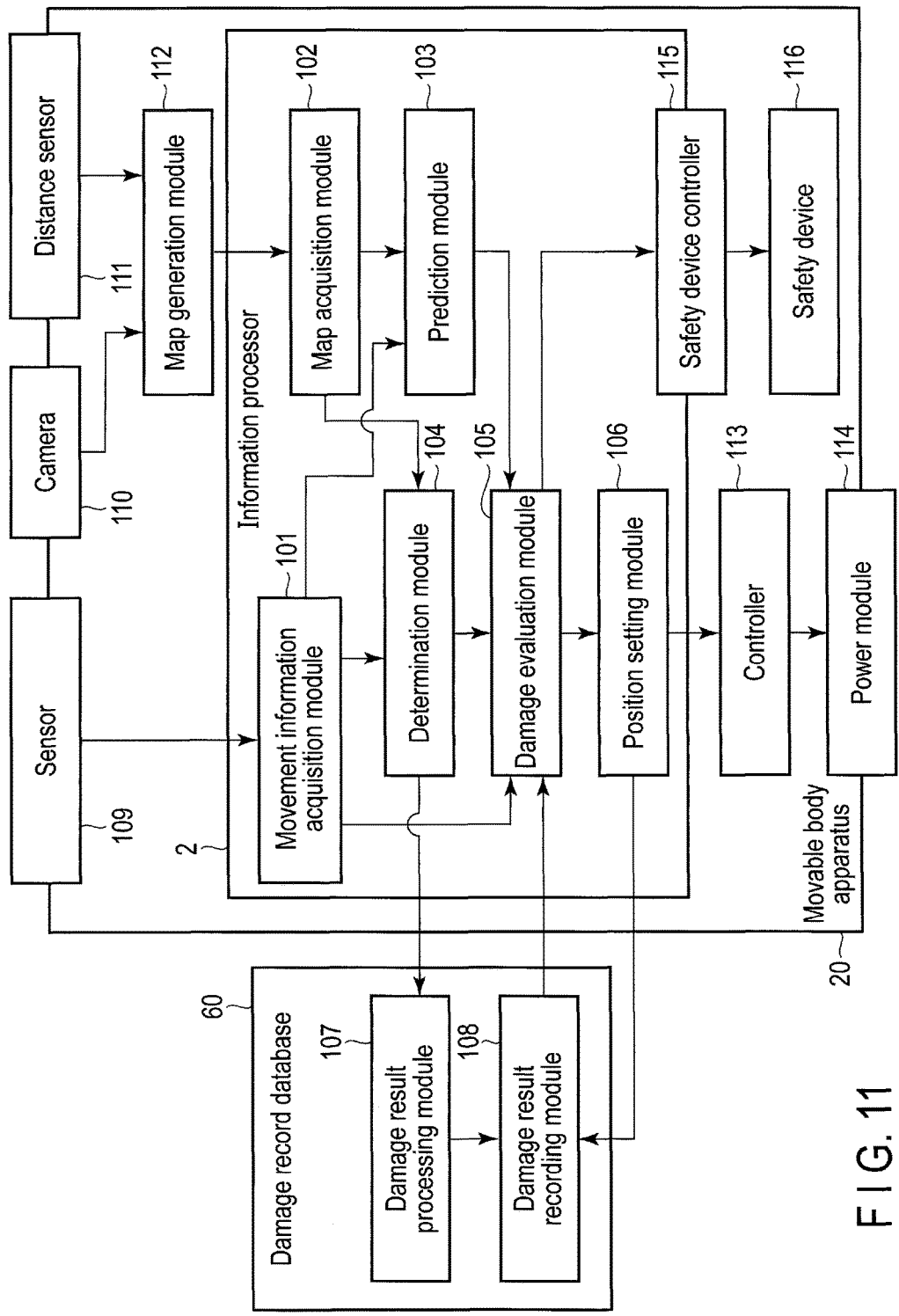
FIG. 11 is an exemplary block diagram shown for explaining the functional configuration of the information processor of the second embodiment.

FIG. 11 is shown for explaining the functional configuration of the information processor 2. The information processor 2 includes a movement information acquisition module 101, a map acquisition module 102, a prediction module 103, a determination module 104, a damage evaluation module 105, a position setting module 106, and a safety device control module 115. These modules 101 to 106 and 115 may be realized as the functional structures of programs executed by the processing circuitry 11. The operations of the movement information acquisition module 101, the map acquisition module 102, the prediction module 103, the determination module 104, the damage evaluation module 105, and the position setting module 106 are as explained in the first embodiment.

When the damage evaluation module 105 determines the target position for the movement of the movable body apparatus 20, the safety device control module 115 controls the safety device 116. That is, when there is a possibility that the movable body apparatus 20 collides with any object, the safety device 116 is controlled. For example, the safety device control module 115 outputs safety device control information for controlling the operation of the safety device 116 to the safety device 116 to protect the passengers.

In this way, the safety device 116, such as an airbag or a seatbelt, is controlled when there is a possibility that the movable body apparatus 20 collides with an obstruction. Thus, it is possible to ensure the safety of the passengers at the time of collision.

The flowchart of FIG. 12 shows an example of the procedure of a process executed by the processing circuitry 11. For the sake of convenience, the flowchart includes the procedure of a process executed by the movable body apparatus 20. The explanation of the same procedure as the information processor 1 of the first embodiment is omitted here.

The safety device control module 115 of the information processor 2 controls the safety device 116 (step S212) after the target position for the movement of the movable body apparatus 20 is output in step S209. After the safety device 116 is controlled, the movable body apparatus 20 moves to the target position (step S210). The position setting module 106 of the information processor 2 may output the target position to the movable body apparatus 20 after the safety device 116 is controlled. Steps S209 and S210 for controlling the movement of the movable body apparatus 20 may be executed in parallel to step S212 for controlling the safety device 116.

Now, this specification explains an example in which map information is generated with reference to FIG. 13 to FIG. 15. FIG. 13 shows an image 51 captured by a camera 110 when the movable body apparatus 20 moves on a road. The image 51 includes multiple objects such as roads 511 and 516, other vehicles 512 and 513, a building 514, and a grass field 515.

As explained in the first embodiment, a map generation module 112 is capable of generating map information, using a technology for identifying the objects in an image, such as semantic segmentation. In the technology for identifying the objects in an image, what each object in the image is identified based on the dictionary data obtained by learning. When the inside of a room is captured, the identification categories include, for example, a floor, a carpet, a tatami mat, a wall, a chair, a desk, a window, a door, a human, a cat, and a dog. When the outside of a building is captured, the identification categories include, for example, a roadway, a footway, a tree, a building, a vehicle, and a human. The dictionary data for identification is retained in the map generation module 112 in advance.

FIG. 14 shows a result of identification 52 in which the objects 511 to 516 in the image 51 are identified. The result of identification 52 shows areas 521 to 526 which are identified by the map generation module 112 using, for example, semantic segmentation and correspond to the objects 511 to 516, respectively. When the result of identification 52 is used, it is possible to determine to which object a pixel on the image 51 corresponds. The map generation module 112 is also capable of determining whether an area corresponding to each of the identified object is a movable area in which the movable body apparatus 20 is movable or an area of an obstruction to the movement of the movable body apparatus 20. In the result of identification 52, for example, each area identified as a roadway may be determined as a movable area. For example, the map generation module 112 determines, of the identified objects 511 to 516, the areas 521 and 526 corresponding to the roads 511 and 516 as movable areas, and determines the areas 522, 523, 524 and 525 corresponding to the other objects 512, 513, 514 and 515 as the areas of obstructions.

Subsequently, the map generation module 112 generates a three-dimensional map regarding the objects present around the movable body apparatus 20 by combining the result of identification 52 and the three-dimensional data obtained by a distance sensor 111. The generated map includes information for identifying the area of each object as well as information indicating the distance from the movable body apparatus 20 to each object in the generated map. The map further includes map information indicating the movable area in which the movable body apparatus 20 is movable in a specific area around the movable body apparatus 20 and areas in which obstructions are present in the specific area. Thus, when the map information is used, it is possible to determine the movable area and an area corresponding to each obstruction. For example, as shown in FIG. 15, the map generation module 112 is capable of extracting a three-dimensional map 53 corresponding to a movable area 531. In a similar manner, the map generation module 112 is capable of extracting a three-dimensional map corresponding to the area of each obstruction from the map information.

FIG. 16 shows an example in which the movable body apparatus 20 is controlled so as to move to the target position when the movement state of the movable body apparatus 20 is abnormal as a result of determination. The damage evaluation module 105 obtains an evaluation value indicating the damage to be caused by the collision between the movable body apparatus 20 and each of the grass field 515, the building 514 and the vehicles 521 and 513 having a movement path in the roads 511 and 516 which are the movable area 531 when the movement state is abnormal. As the evaluation value indicating the damage, one of the score of the damage to be caused to each obstruction and the score of the damage caused to the movable body apparatus 20 may be used, or both of them may be used. The damage evaluation module 105 calculates a position corresponding to the grass field 515 indicating the least damage as the target position based on the obtained evaluation values. For example, the damage evaluation module 105 determines that movement corresponding to the obstruction indicating the least score of the damage caused to the obstruction and a less score caused to the movable body apparatus 20 will cause the least damage. The position setting module 106 outputs the calculated target position to a controller 113. The safety device control module 115 outputs control information to the safety device 116 in preparation for collision or impact. The controller 113 controls a power module 114 such that the movable body apparatus 20 goes to the grass field 515 as the target position as shown in FIG. 16.

In the above manner, when the movement state is abnormal, the movable body apparatus 20 can be caused to move to a position which reduces the damage caused to the movable body apparatus 20 and/or other objects. Even if the movable body apparatus 20 deviates from the movable area 531, the movable body apparatus 20 can be caused to evacuate to a safe place which is assumed to reduce the damage, such as the grass field, without colliding with the other vehicles 512 and 513 or the building 514.

Various functions described in the embodiments may be implemented by processing circuitry. Examples of the processing circuitry include a programmed processor such as a central processing unit (CPU). The processor realizes each of the described functions by executing instructions corresponding to a computer program stored in a memory. The processor may be a microprocessor including an electronic circuit. Examples of the processing circuitry also include a digital signal processor (DSP), an application-specific integrated circuit (ASIC), a microcontroller, a controller, and other electronic circuit components. Each of the components other than the CPU in the above embodiments may be also realized by processing circuitry.

Since each process of the embodiments can be implemented by a computer program, the same advantage as the embodiments can be easily achieved by merely installing the computer program into a computer through a computer-readable storage medium that stores the computer program, and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processor comprising:
a memory; and
processing circuitry configured to:
receive an image and distance data from a movable body apparatus, the image including a part of a vicinity of the movable body apparatus, and the distance data being generated by distance sensors for measuring a distance to each of objects present around the movable body apparatus;
generate area information by using the image and the distance data, the area information indicating a second area and third areas in a first area around the movable body apparatus, wherein the movable body apparatus is movable in the second area and objects are present in the third areas, respectively;
receive movement information from the movable body apparatus, the movement information including a velocity, a movement direction and/or an acceleration of the movable body apparatus;
acquire, when a movement state of the movable body apparatus is abnormal, evaluation values by using the area information and the movement information, the evaluation values being calculated based on damages to be caused when the movable body apparatus collides with the objects in the third areas, respectively;
determine, based on the evaluation values, a first position corresponding to a first object of the objects which causes a least damage; and
provide first position-related information about the determined first position for use in controlling the movable body apparatus to move to the determined first position.

2. The information processor of claim 1, wherein the processing circuitry is further configured to:
determine whether the movement state of the movable body apparatus is abnormal by using the movement information.

3. The information processor of claim 2, wherein the processing circuitry is further configured to:
determine whether there is a possibility that the movable body apparatus collides with any one of the objects in the third areas by using the movement information and the area information; and
determine that the movement state of the movable body apparatus is abnormal when there is a possibility that the movable body apparatus collides with any one of the objects.

4. The information processor of claim 2, wherein the processing circuitry is further configured to:
determine whether there is a possibility that a moving second object of the objects in the third areas collides with the movable body apparatus by using the area information; and
determine that the movement state of the movable body apparatus is abnormal when there is a possibility that the second object collides with the movable body apparatus.

5. The information processor of claim 1, wherein the area information is generated by using the image obtained by capturing the first area.

6. The information processor of claim 1, wherein the area information comprises information indicative of a distance from the movable body apparatus to each of the second area and the third areas.

7. The information processor of claim 1, wherein the processing circuitry is further configured to:
predict, when the movement state of the movable body apparatus is abnormal, second area information by using the movement information and the area information, the second area information indicating, a first time after a current time, a fourth area in the first area and fifth areas in the first area, wherein the movable body apparatus is movable in the fourth area and an object is present in each of the fifth areas, respectively;
acquire second evaluation values by using the second area information and the movement information, the second evaluation values being calculated based on damages to be caused when the movable body apparatus collides with the objects in the fifth areas, respectively;
determine, based on the evaluation values, a second position corresponding to a second object of the objects which causes a least damage; and
provide second position-related information about the determined second position for use in controlling the movable body apparatus to move to the determined second position.

8. The information processor of claim 1, wherein the memory is configured to store, when the movable body apparatus collides with the first object, information indicative of the first object and a damage caused by the collision.

9. The information processor of claim 1, wherein the movable body apparatus is a vehicle for transporting a human, and comprises a safety device for protecting the human, and the information processor further comprises a controller configured to control the safety device when the position is determined.

10. A movable body apparatus comprising:
a power module for moving the movable body apparatus;
processing circuitry configured to:
receive an image and distance data, the image including a part of a vicinity of the movable body apparatus, and the distance data being generated by distance sensors for measuring a distance to each of objects present around the movable body apparatus,
generate area information by using the image and the distance data, the area information indicating a second area and third areas in a first area around the movable body apparatus, wherein the movable body apparatus is movable in the second area and objects are present in the third areas, respectively;
receive movement information including a velocity, a direction and/or an acceleration of the movable body apparatus;
acquire evaluation values by using the area information and the movement information, the evaluation values being calculated based on damages to be caused when the movable body apparatus collides with the objects in the third areas, respectively; and
determine, based on the evaluation values, a first position corresponding to a first object of the objects which causes a least damage; and
a first controller configured to control the power module such that the movable body apparatus moves to the determined first position.

11. The movable body apparatus of claim 10, wherein the processing circuitry is further configured to:
determine whether the movement state of the movable body apparatus is abnormal by using the movement information.

12. The movable body apparatus of claim 11, wherein the processing circuitry is further configured to:

determine whether there is a possibility that the movable body apparatus collides with any one of the objects in the third areas by using the movement information and the area information; and
determine that the movement state of the movable body apparatus is abnormal when there is a possibility that the movable body apparatus collides with any one of the objects.

13. The movable body apparatus of claim 11, wherein the processing circuitry is further configured to:
determine whether there is a possibility that a moving second object of the objects in the third areas collides with the movable body apparatus by using the area information; and
determine that the movement state of the movable body apparatus is abnormal when there is a possibility that the second object collides with the movable body apparatus.

14. The movable body apparatus of claim 10, wherein the area information is generated by using the image obtained by capturing the first area.

15. The movable body apparatus of claim 10, wherein the area information comprises information indicative of a distance from the movable body apparatus to each of the second area and the third areas.

16. The movable body apparatus of claim 10, wherein the processing circuitry is further configured to:
predict, when the movement state of the movable body apparatus is abnormal, second area information by using the movement information and the area information, the second area information indicating, a first time after a current time, a fourth area in the first area and fifth areas in the first area, wherein the movable body apparatus is movable in the fourth area and an object is present in each of the fifth areas, respectively;
acquire second evaluation values by using the second area information and the movement information, the second evaluation values being calculated based on damages to be caused when the movable body apparatus collides with the objects in the fifth areas, respectively; and
determine, based on the evaluation values, a second position corresponding to a second object of the objects which causes a least damage, wherein
the controller is configured to control the power module such that the movable body apparatus moves to the determined second position.

17. The movable body apparatus of claim 10, wherein the memory is configured to store, when the movable body apparatus collides with the first object, information indicative of the first object and a damage caused by the collision.

18. The movable body apparatus of claim 10, wherein the movable body apparatus is a vehicle for transporting a human, and further comprises a safety device for protecting the human and a second controller configured to control the safety device when the position is determined.

19. A method comprising:
receiving an image and distance data from a movable body apparatus, the image including a part of a vicinity of the movable body apparatus, and the distance data being generated by distance sensors for measuring a distance to each of objects present around the movable body apparatus;
generating area information by using the image and the distance data, the area information indicating a second area and third areas in a first area around a movable body apparatus, wherein the movable body apparatus is movable in the second area and objects are present in the third areas, respectively;

receiving movement information from the movable body apparatus, the movement information including a velocity, a movement direction and/or an acceleration of the movable body apparatus;

acquiring, when a movement state of the movable body apparatus is abnormal, evaluation values by using the area information and the movement information, the evaluation values being calculated based on damages to be caused when the movable body apparatus collides with the objects in the third areas, respectively;

determining, based on the evaluation values, a position corresponding to a first object of the objects which causes a least damage; and providing position-related information for use in controlling the movable body apparatus to move to the determined position.

\* \* \* \* \*